United States Patent [19]
Schauffele

[11] 3,840,784
[45] Oct. 8, 1974

[54] HIGH VOLTAGE PROTECTION CIRCUIT

[75] Inventor: Carl N. Schauffele, Rochester, N.Y.

[73] Assignee: Eastman Kodak Company, Rochester, N.Y.

[22] Filed: Apr. 5, 1973

[21] Appl. No.: 348,425

[52] U.S. Cl............... 317/31, 317/33 VR, 317/16, 323/22 SC, 307/252 J
[51] Int. Cl............................................. H02h 3/20
[58] Field of Search............... 178/7.3, 7.8, DIG. 11; 322/73; 323/22, 63, 64, 79, 81, 22 SC; 307/252 J, 235; 317/33 VR, 31, 16

[56] References Cited
UNITED STATES PATENTS
3,546,536  12/1970  Umin ............................ 178/7.3 R
3,576,487  4/1971   Chase .......................... 320/39
3,611,002  10/1971  Wedam ......................... 178/7.5

OTHER PUBLICATIONS
P. Essinger, IBM Technical Disclosure Bulletin, Vol. 2. No. 4, December 1959, Overvoltage Protective Circuit.
Solid State Products Inc., Bulletin D420-02-12-59, p. 5, Applications and Circuit Design Notes.

Primary Examiner—J. D. Miller
Assistant Examiner—Patrick R. Salce
Attorney, Agent, or Firm—W. F. Noval

[57] ABSTRACT

A high voltage protection circuit for cathode ray tube apparatus such as television recievers and film video players. The protection circuit effects shut down of the high voltage power supply which supplies a high voltage to the cathode ray tube when the output of the high voltage regulator exceeds a predetermined value. The high voltage power supply is driven by a horizontal driver circuit which is switched on and off by a voltage controlled oscillator. The voltage regulator senses the output of the high voltage supply and controls the voltage switched by the horizontal driver circuit. The protection circuit includes a sensing circuit for sensing the output of the voltage regulator, an impedance circuit connected to ground having a high impedance state and a low impedance state and a bistable control circuit connected between the sensing circuit, the voltage controlled oscillator and the impedance circuit. When the output voltage of the voltage regulator is sensed by the sensing circuit to exceed a predetermined value, the bistable control circuit is switched to a conducting state to thereby switch the impedance circuit from a high impedance state to a low impedance state. The voltage controlled oscillator is thus provided with a low impedance path to ground through the bistable circuit and low impedance circuit to shut the oscillator off and to shut down the high voltage power supply.

5 Claims, 4 Drawing Figures

HIGH VOLTAGE PROTECTION CIRCUIT

BACKGROUND OF THE INVENTION

1. Field of the Invention

This invention relates to an high voltage protection circuit for cathode ray tube apparatus and more particularly to a protection circuit which shuts off the high voltage supply of a cathode ray tube apparatus when the high voltage exceeds a predetermined value.

2. Description of the Prior Art

Apparatus using cathode ray tubes either as a display device or as a scanning device are well known in the art. An example of the former such apparatus is the well known television receiver which converts a video signal transmitted to the receiver into a visual display on the face of the cathode ray tube. An example of film videoplayer apparatus utilizing a scanning type cathode ray tube is described in commonly assigned, co-pending, U.S. Pat. application Ser. No. 60,493. As disclosed, a flying spot scanning cathode ray tube is used to scan the frames of a motion picture film with a beam of light in the standard television interlace raster scanning pattern. The beam of light is modulated by the image pattern on the film frame and the modulated light is detected and transformed into a video signal by optical to electrical signal transducer means. This video signal is then processed to a composite video signal which then may be supplied to the input terminals of a television receiver to provide a reproduction of the motion picture film frame on the television screen of the receiver. In such a film videoplayer apparatus a horizontal deflection and high voltage power supply is provided to provide the horizontal deflection current to cause the electron beam to sweep across the face of the scanning tube in a raster pattern to produce the scanning beam of light and also to produce a high voltage which is applied to the cathode ray tube. Since the cathode ray tube used with such apparatus commonly requires a high voltage potential of about 25,000 volts, should the high voltage exceed this potential, there exists the possibility of damage to the power supply elements as well as the possibility of the cathode ray tube and other components of the system becoming a shock and x-ray radiation hazard. It is thus desirable that when the high voltage exceeds a predetermined level, a protection circuit be provided to shut down the high voltage power supply to avoid such damage and hazards. It is also desirable that such a high voltage protection circuit be simple and economical and that it continue shut down of the high voltage power supply until the cause of the excess voltage is corrected.

SUMMARY OF THE INVENTION

It is therefore an object of the present invention to provide a high voltage protection circuit for cathode ray tube apparatus which effects shut down of the high voltage power supply of the apparatus when the high voltage applied to the cathode ray tube exceeds a predetermined value.

It is still another object of the present invention to provide, in film videoplayer apparatus using a scanning type of cathode ray tube, a simple and economical excess voltage protection circuit which maintains shut down of the high voltage supply until the cause of the excess voltage is corrected.

In general, according to the present invention, there is provided in cathode ray tube apparatus high voltage protection circuit which senses the output voltage of a high voltage regulator and effects turn off of a voltage controlled oscillator which controls the operation of the high voltage supply to shut such supply down when the output voltage of the regulator exceeds a predetermined level. Preferably, the protection circuit includes a semiconductor device which continuously senses the output of the high voltage regulation circuit and when the voltage exceeds the predetermined level, the semiconductor device is activated to connect the voltage controlled oscillator to ground through a low impedance circuit to shut the voltage control oscillator off and to maintain it off until the condition causing the excess voltage is corrected.

The invention, and its objects and advantages, will become more apparent in the detailed description of the preferred embodiments presentd below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because photographic apparatus are well known, the present description will be directed in particular to elements forming part of, or cooperating more directly with, the present invention, apparatus not specifically shown or described herein being understood to be selectable from those known in the art.

Figure 1:
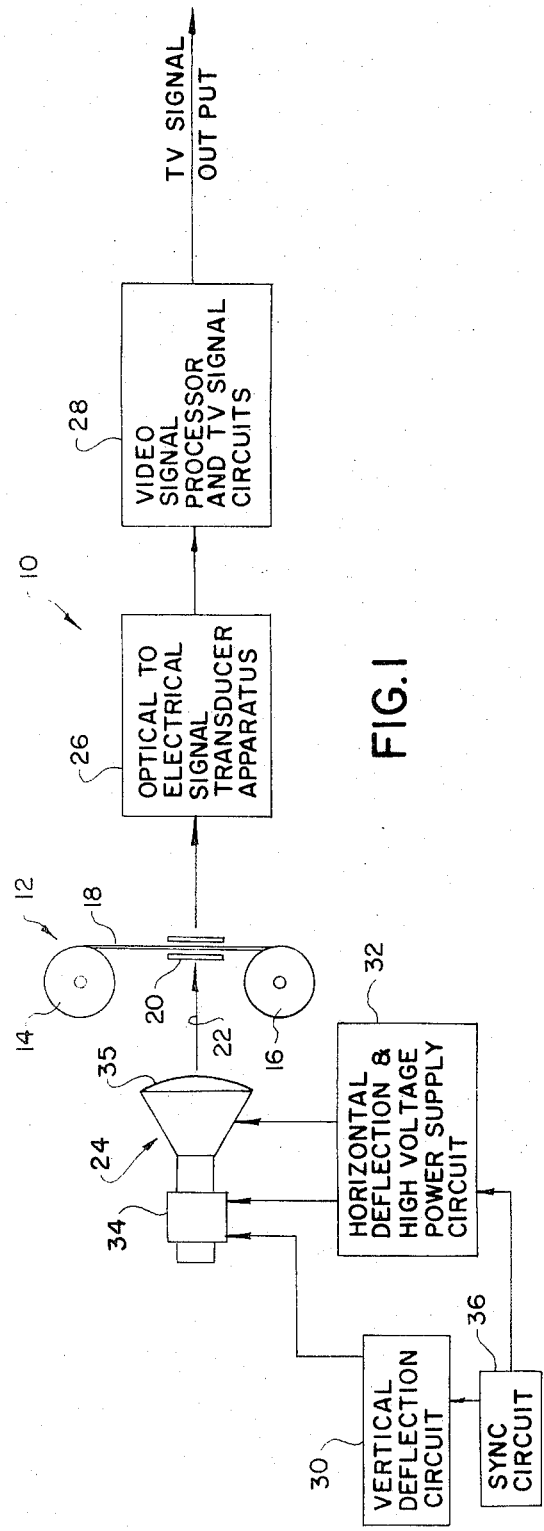
FIG. 1 is a block diagram view showing a film videoplayer in which the excess voltage protection circuit of the present invention may be used.

Referring now to FIG. 1, there is shown a film videoplayer in which the high voltage protection circuit of the present invention may be used. Such a videoplayer is described in greater detail in the aforementioned co-pending application Ser. No. 60,493. As shown, film videoplayer 10 generally comprises a film transport assembly 12 which may for example include a supply reel 14, a take up reel 16 and means for transporting film 18 from reel 14 to reel 16 past a scanning station 20 intersecting optical axis 22. A flying spot scanning cathode ray tube 24 is used to scan the frame of film 18 with a beam of light in the standard interlace raster scanning pattern of commercial television. In such apparatus, the beam of light is modulated by the image pattern on a film frame of film 18 and the modulated light is detected and transformed into a video signal by optical to electrical signal transducer apparatus 26. This video signal is then processed by video signal processor and television signal circuit 28 to produce a composite video signal which may be applied to a standard television receiver to effect a reproduction of the motion picture film frame on the television screen thereof.

The raster scan of the beam of light produced by tube 24 is effected by circuitry including horizontal and vertical deflection circutis and a high voltage power supply. As shown in FIG. 1, vertical deflection circuit 30 and horizontal deflection and high voltage power supply circuit 32 provide deflection signals to yoke 34 of tube 24 and high voltage to the anode thereof to produce the desired raster scan of the electron beam which sweeps across the face 35 of tube 24 to produce a flying spot scanning beam. Synchronizing (sync) circuit 36 provides suitable horizontal and vertical synchronizing signals to circuits 32 and 30 to effect proper synchronization thereof.

Figure 2:
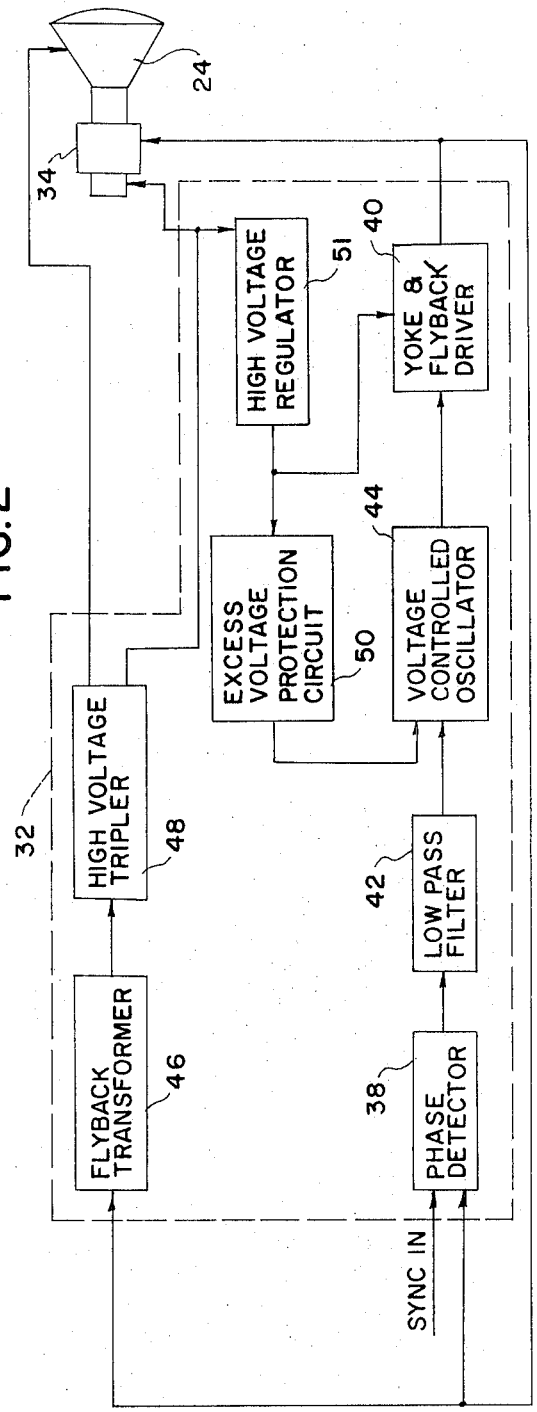
FIG. 2 is a block diagram of the horizontal deflection and high voltage power supply circuit shown in FIG. 1.

Referring now to FIG. 2, there is shown in greater detail a horizontal deflection and high voltage power supply circuit 32 in which the high voltage protection circuit of the present invention may be used. As shown, a sync pulse from sync circuit 36 is applied to phase detector 38 which compares incoming horizontal sync pulses with fly back pulses from yoke and flyback driver circuit 40 to produce a direct current voltage which is proportional to the phase difference between the pulse trains supplied from sync circuit 36 and driver circuit 40. Low pass filter 42 filters this dc voltage and the filtered voltage is utilized to control voltage controlled oscillator 44 which thus operates at the same frequency as the incoming synchronization pulses and with a predetermined phase relationship therewith.

The output of oscillator 44 is applied to driver 40 to effect switching on and off thereof thus generating an output wave form which is applied to yoke 34 to produce horizontal deflection current therein.

The ouptut of driver 40 is also applied to flyback transformer 46 in which flyback pulses are produced during the retrace of the electron beam of tube 24. The output of transformer 46 is applied to a high voltage tripler 48 which rectifies the flyback pulses and triples them to produce the high voltage dc to be applied to tube 24.

In order that the voltage applied to tube 24 be maintained substantially constant, the output of tripler 48 is also applied to a high voltage regulator 51 which compares the output with a reference voltage and applies a voltage to driver 40 which becomes the amplitude of the output wave form produced by driver 40. Since the high voltage output of tripler 48 is directly proportional to the amplitude of the wave form produced by driver 40 the high voltage is thus maintained at a predetermined level.

Since film videoplayer 10 may be used in environments such as in school auditoriums or in the home where groups of children and adults may be exposed to excessive x-rays which may be produced should the high voltage applied to the videoplayer cathode ray tube exceed the necessary predetermined level, it is desirable that some means be provided for shutting down the high voltage circuit when a condition causing an excess high voltage exists. According to the present invention, a high voltage protection circuit 50 is provided to sense the voltage output from the high voltage regulator and when a predetermined voltage level is exceeded, to effect shut down of voltage controlled oscillator 44 and to maintain shut down thereof until the operator of videoplayer 10 has an opportunity to correct the condition causing the excess voltage.

Figure 3:
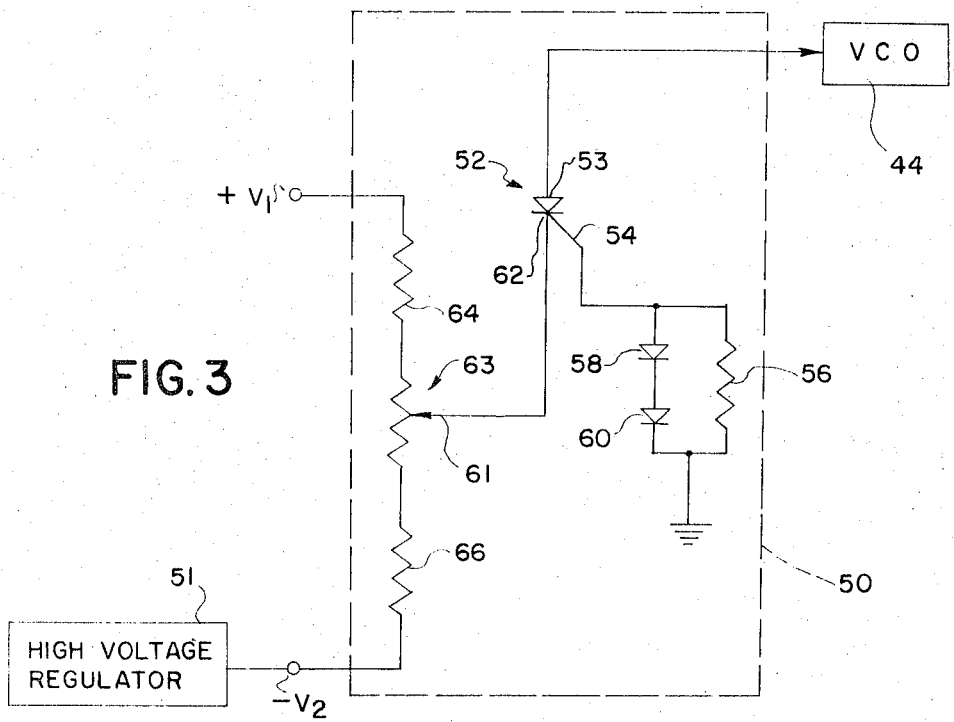
FIGS. 3 and 4 are alternative embodiments of an high voltage protection circuit according to the present invention.
Figure 4:
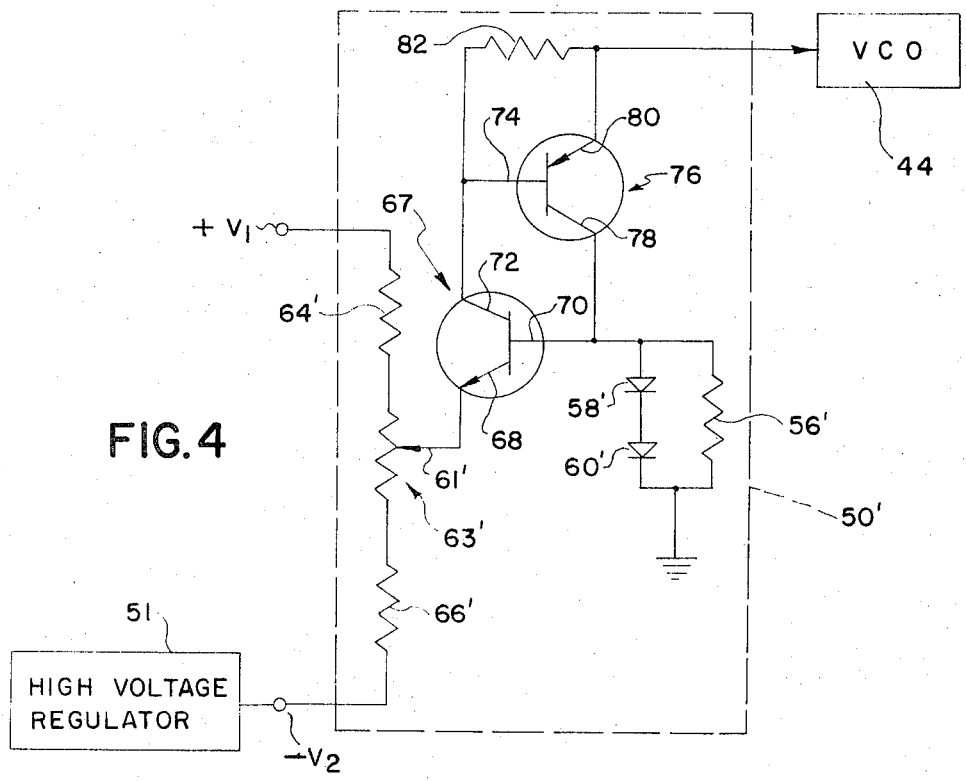

Referring now to FIGS. 3 and 4 there are shown alternative embodiments of excess voltage protection circuit 50. In the embodiment shown in FIG. 3 circuit 50 includes a controlled rectifier 52 having its anode 53 connected to the input of voltage control oscillator 44, its control electrode 54 connected to ground by means of resistor 56 and diodes 58 and 60 connected in parallel with resistor 56 and having its cathode 62 connected to the wiper arm 61 of a variable resistor 63. Resistor 63 is part of a voltage divider resistor chain including resistors 64 and 66 in series with resistor 62 connected between a reference voltage $+V_1$ and the output $-V_2$ of high voltage regulator 51.

The operation of circuit 50 of FIG. 3 is as follows: Under normal operating conditions of videoplayer 10, wiper arm 61 of resistor 63 will be above ground potential when the output voltage $-V_2$ of regulator 51 has not exceeded a predetermined level, for example, $-24$ bolts. If, for some reason, the output of regulator 51 should increase negatively thereby increasing the high voltage output of tripler 48 proportionately, the voltage at wiper arm 61 of resistor 63 will drop below ground potential thus forward biasing controlled rectifier 52 and turning it on. The input to VCO 44 will be connected through a low impedance path to ground through anode 53, control electrode 54 and diodes 58 and 60. At the same time, sufficient holding current will flow between cathode 53 and anode 62 of rectifier 52 to hold rectifier 52 in a conductive state. Thus, there is a shut down of VCO 44 and the rest of horizontal deflection and high voltage power supply 32 until the operator of videoplayer 10 has had the opportunity to correct the condition causing the excess voltage. Since VCO 44 is effectively clamped to ground through diodes 58 and 60, the divider chain comprising resistors 52, 64 and 66 may be a high impedance chain since it only serves to initially turn on controlled rectifier 52.

Referring now to FIG. 4 there is shown an alternative embodiment of protection circuit 50' wherein controlled rectifier 52 is replaced by a pair of transistors connected in the equivalent controlled rectifier configuration. As shown, npn transistor 67 has its emitter 68 connected to wiper arm 61' of variable resistor 63', its base 70 connected to ground through the parallel combination of resistor 56' and diodes 58' and 60' and its collector 72 connected to the base 74 of pnp transistor 76. Collector 78 of transistor 76 is connected to the base 70 of transistor 67 and emitter 80 of transistor 76 is connected to VCO 44. Resistor 82 is also connected between emitter 80 and base 74 of transistor 76.

In operation, protection circuit 50' functions substantially in the same manner as circuit 50 of FIG. 3. Wiper arm 61' is maintained at a voltage above ground potential when videoplayer 10 is operating normally. However, when $-V_2$ output of regulator 51 increases negatively, emitter 68 of transistor 67 will drop below ground potential thus forward biasing transistor 67 whose base 70 is referenced through resistor 56' to ground. Transistor 67 is turned on thus turning on transistor 76 and latching to hold both transistors 67 and 76 on. VCO 44 will be connected to ground through a low impedance path provided by diodes 58 and 60 and will be turned off. At the same time, sufficient holding current will flow through transistor 76 to maintain transistors 76 and 67 in a latched condition.

Thus it is seen that there is provided in cathode ray tube apparatus a high voltage protection circuit which prevent costly damage to components and creation of excessive x-rays should the high voltage supplied to the cathode ray tube exceed a predetermined level. The protection circuit is simple and economical and insures that the high voltage supply will be maintained off until the condition causing the excessive high voltage is corrected. In addition, the threshold voltage at which the high voltage power supply is turned off is adjustable and due to the high impedance voltage divider sensing circuit, the protection circuit will have no effect on the operation of the high voltage power supply until an excess high voltage from the voltage regulator is sensed by the circuit.

The invention has been described in detail with particular reference to preferred embodiments thereof, but it will be understood that variations and modifications can be effected within the spirit and scope of the invention.

I claim:

1. In flying spot scanner cathode ray tube apparatus having a voltage controlled oscillator and a high voltage regulator, a high voltage protection circuit comprising:

a voltage divider circuit connected between a reference voltage and the output of said voltage regulator, said voltage divider circuit including a variable resistor having a voltage pick-off terminal;

a diode circuit having first and second terminals; and a semiconductor device having first, second and third terminals respectively connected to the input of said voltage controlled oscillator, to the pick-off terminal of said variable resistor, and to said first terminal of said diode circuit, said second terminal of said diode circuit being connected to ground.

2. The circuit of claim 1 wherein said semiconductor device comprises a controlled rectifier having anode, cathode and gate terminals respectively comprising said first, second and third terminals of said semiconductor device.

3. The circuit of claim 2 wherein said diode circuit includes a pair of serially connected diodes connected in parallel with a resistor.

4. The circuit of claim 1 wherein said semiconductor device comprises first and second transistors respectively having base, emitter and collector electrodes, wherein the emitter of said first transistor is connected to said pick-off terminal of said variable resistor, the collector of said first transistor is connected to the base of said second transistor, the collector of said second transistor and the base of said first transistor are connected together and to the first terminal of said diode circuit and the emitter of said second transistor is connected to said voltage controlled oscillator.

5. The circuit of claim 2 wherein said diode circuit includes a pair of serially connected diodes connected in parallel with a resistor.

* * * * *